(12) United States Patent
Kanehisa et al.

(10) Patent No.: US 7,758,250 B2
(45) Date of Patent: Jul. 20, 2010

(54) BICYCLE HUB

(75) Inventors: Takanori Kanehisa, Sakai (JP); Atsuhiro Nishimura, Sakai (JP)

(73) Assignee: Shimano Inc., Osaka (JP)

( * ) Notice: Subject to any disclaimer, the term of this patent is extended or adjusted under 35 U.S.C. 154(b) by 1301 days.

(21) Appl. No.: 11/258,869

(22) Filed: Oct. 27, 2005

(65) Prior Publication Data

US 2007/0098316 A1 May 3, 2007

(51) Int. Cl.
*F16C 13/00* (2006.01)
*B60B 27/00* (2006.01)

(52) U.S. Cl. .................................. 384/545; 301/110.5

(58) Field of Classification Search ............... 384/545, 384/546; 301/110.5; 74/594.1
See application file for complete search history.

(56) References Cited

U.S. PATENT DOCUMENTS

| | | | |
|---|---|---|---|
| 1,527,915 A | 2/1925 | Phelan | |
| 3,170,549 A * | 2/1965 | Baker, III | 192/217.6 |
| 4,810,040 A * | 3/1989 | Chi | 301/110.5 |
| 5,531,510 A | 7/1996 | Yamane | |
| 5,575,540 A | 11/1996 | Chi | |
| 6,755,095 B2 * | 6/2004 | Yamanaka | 74/594.1 |
| 2004/0182654 A1 | 9/2004 | Chen | |
| 2005/0185872 A1 | 8/2005 | Kanehisa et al. | |
| 2006/0027537 A1* | 2/2006 | Lambert et al. | 219/121.6 |

FOREIGN PATENT DOCUMENTS

| | | |
|---|---|---|
| EP | 1 134 098 A2 | 9/2001 |
| EP | 1 288 117 A2 | 3/2003 |
| FR | 2 482 526 | 11/1980 |
| JP | 52-60062 U | 5/1977 |

* cited by examiner

*Primary Examiner*—William C Joyce
(74) *Attorney, Agent, or Firm*—Global IP Counselors, LLP

(57) ABSTRACT

A bicycle hub is provided that comprises a hub axle, a hub body rotatably mounted on the hub axle by a pair of bearings. The bicycle hub also has an inner tubular structure including a pair of inner tubes. One of the inner tubes is fixedly secured relative to a first body end adjacent to a first bearing, while the other inner tube is fixedly secured relative to the second body end adjacent to the second bearing. The inner tubes have inner free end portions that are telescopically arranged so that the inner tubes can be used with several different has that have different axial widths.

17 Claims, 6 Drawing Sheets

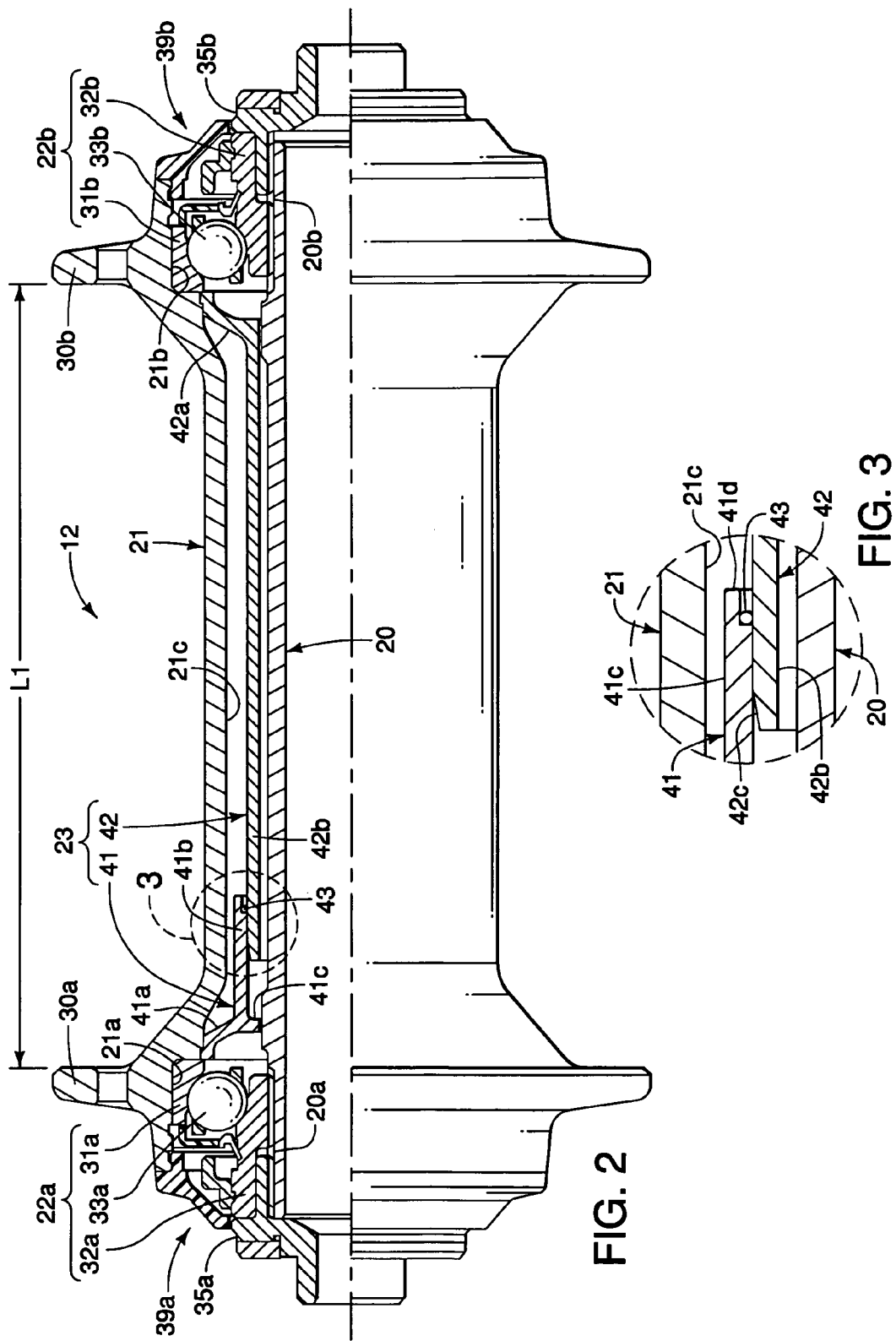

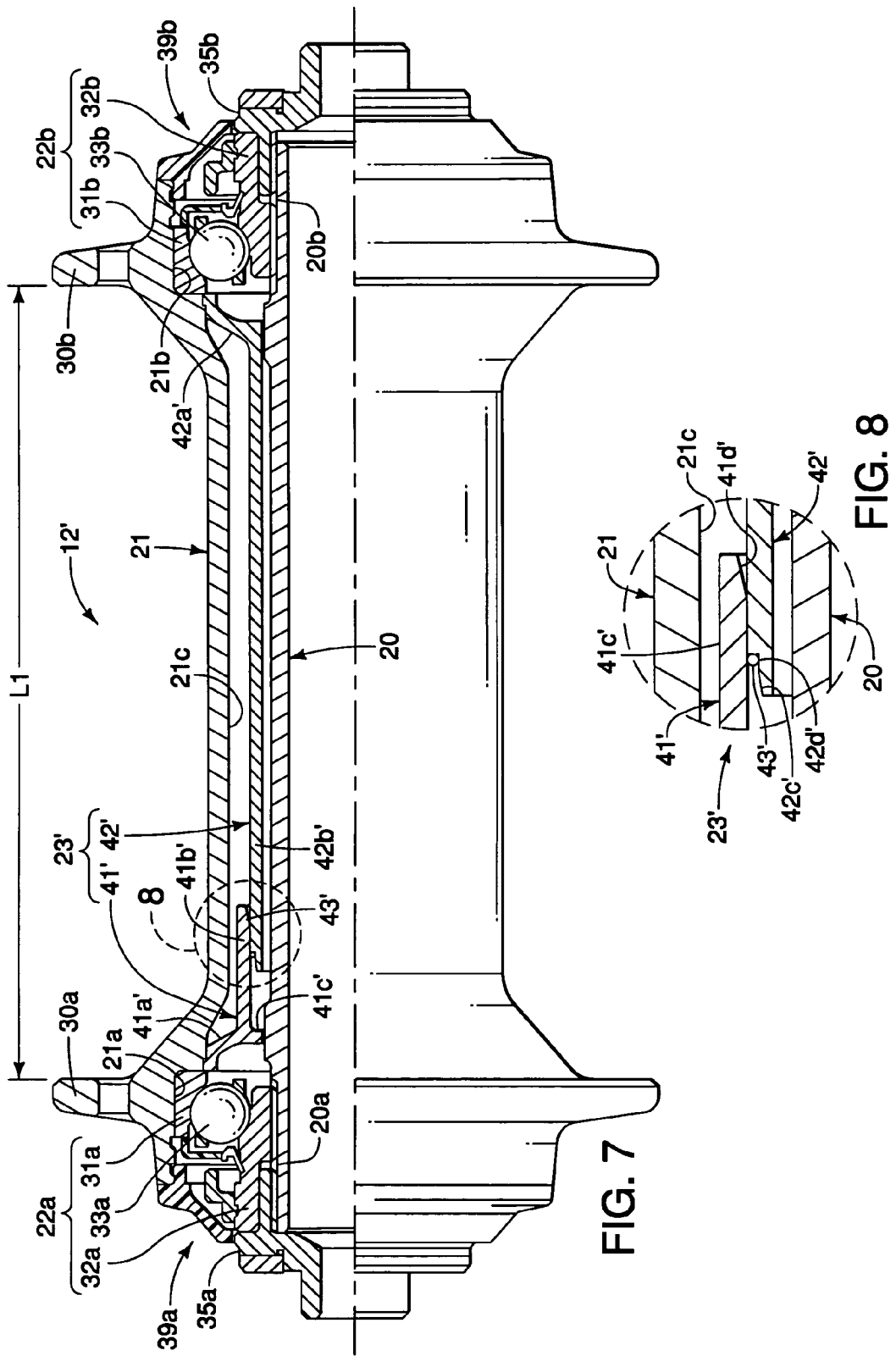

BICYCLE HUB

BACKGROUND OF THE INVENTION

1. Field of the Invention

The present invention generally relates to a bicycle hub of a bicycle wheel that is mounted to a bicycle frame. More specifically, the present invention relates to a bicycle hub with an inner tubular structure for substantially preventing the bearing grease from leaking towards the center of the hub.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well. One component that has been extensively redesigned is the hub of the bicycle.

Generally, bicycle hubs have a hub shaft or axle mounted in a non-rotatable manner to a rear part of the bicycle frame and a hub shell or body mounted in a rotatable manner to the hub axle by a pair of bearing assemblies. In the case of front hubs, the hub shell or body is freely rotatable on the hub axle in both directions. However, in the case of some rear hubs, one side of the rear hub is provided with a drive body or driving cylinder that is mounted in a freely rotatable manner to one end of the hub shell, and a one-way clutch arranged between the driving cylinder and the hub shell to transmit rotation from the driving cylinder to the hub shell in one direction. The driving cylinder is configured and arranged to have a plurality of sprockets mounted to a radially outward-facing surface of the driving cylinder such that the sprockets can neither rotate nor move axially with respect to the driving cylinder. Thus, the driving cylinders of these types of rear hubs only rotate in one direction on their hub axles.

One example of a conventional bicycle hub is disclosed in Japanese Utility Model Publication No. S52-60062. This conventional bicycle hub is installed in the central portion of a wheel of a bicycle with spokes extending from the hub to a rim. This conventional bicycle hub has a hub axle, a hub body and a pair of bearings. The hub axle is non-rotatably mounted to a frame of the bicycle (for example, to a front-fork). The hub body is coaxially coupled to the hub axle so that the hub body is disposed radially outwardly with respect to the hub axle. The bearings are configured and arranged to support the hub body so that the hub body can freely rotate around the hub axle. The outer peripheral surface of the hub axle includes a pair of male screw sections in axial ends thereof so that the hub is mounted to the frame by a pair of nuts that are screw on axial ends of the male screw of the hub axle. The bearings are angular-type bearings. Each of the bearings is provided with an outer ring or cup, an inner ring or cone, and a plurality of rolling components (balls). The outer ring is disposed along an inner peripheral surface of the hub body and includes a ball receiving surface. The inner ring is screwed into the hub axle and includes a ball pushing surface. The rolling components are disposed between the outer ring and the inner ring at predetermined intervals in a circumferential direction of the hub.

The inner portion of each of the bearings is filled with grease in order to make the rotation of the bearings smooth. The ball receiving surface of the outer ring is arranged as a concaved surface that faces toward a generally axial outward direction of the hub axle. The ball pushing surface of the inner ring is arranged as a concaved surface that faces toward a generally axial inward direction of the hub axle. The angular-type ball bearing installed on the hub is designed to maintain a certain degree of clearance or gap between the radial innermost peripheral surface of the outer ring and an outer peripheral surface of the hub axle. Moreover, a sealing component is coupled to an outer axial direction of the bearing. Therefore, the bearing is designed so that the grease does not leak towards the outer axial direction of the bearing.

However, since there is the clearance between the outer ring and the hub axle in at an axial inner position of the bearing, the grease filled within the bearing occasionally leaks towards the inner axial direction of the bearing. Especially when the hub includes the male screw section is formed in the same screw direction along the entire surface of the outer peripheral surface of the hub axle, the male screw acts like a pump due to the rotation of the wheel (i.e., the rotation of the outer ring of the bearing) relative to the hub axle. Consequently, the grease flows out from the bearing toward the inner axial direction of the hub axle. For example, in a case in which the male screw is a right-handed screw, in the bearing on the right side as viewed from the rear side of the bicycle, when the wheel rotates in the direction of travel, the grease tends to flow out toward the inner axial direction of the hub axle. When the grease flows out from the bearing toward the inner axial direction of the hub axle, the grease tends to travel toward a relatively larger space behind the outer ring and retained in that space due to the centrifugal force. In such a case, the amount of the grease in the bearing becomes insufficient, and rotation of the wheel deteriorates.

In view of the above, it will be apparent to those skilled in the art from this disclosure that there exists a need for an improved bicycle hub. This invention addresses this need in the art as well as other needs, which will become apparent to those skilled in the art from this disclosure.

SUMMARY OF THE INVENTION

One object of the present invention is to provide to a hub with an inner tubular structure that substantially prevent grease from flowing out from the bearings toward the inner axial direction.

Another object of the present invention is to provide to a hub with an inner tubular structure that can be used with hubs having different axial lengths between the bearings.

Another object of the present invention is to provide to a hub with an inner tubular structure that is relatively easy to assembly.

In order to achieve the above mentioned object and other objects of the present invention, a bicycle hub is provided that comprises a hub axle, a hub body, a first bearing, a second bearing and an inner tubular structure. The hub axle has a first axle end and a second axle end. The hub body has a first body end and a second body end with the hub body being coaxially disposed about the hub axle and rotatable with respect to the hub axle. The first bearing is disposed between the first body end of the hub body and the first end of the hub axle. The second bearing is disposed between the second body end of the hub body and the second axle end of the hub axle. The inner tubular structure includes a first inner tube and a second inner tube. The first inner tube has a first fixed portion fixedly secured relative to the first body end adjacent to the first bearing and a first free end portion. The second inner tube has a second fixed portion fixedly secured relative to the second body end adjacent to the second bearing and a second free end portion. The first and second free end portions are telescopically arranged.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 2 is a partial cross sectional view of the front hub provided with the inner tubular structure in accordance with the first embodiment of the present invention;

FIG. 3 is an enlarged partial cross sectional view of the telescoping area of the inner tubular structure that is circled in dashed lines in FIG. 2;

FIG. 7 is a partial cross sectional view of the front hub provided with an inner tubular structure in accordance with a second embodiment of the present invention;

FIG. 8 is an enlarged partial cross sectional view of the telescoping area of the inner tubular structure that is circled in dashed lines in FIG. 7;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
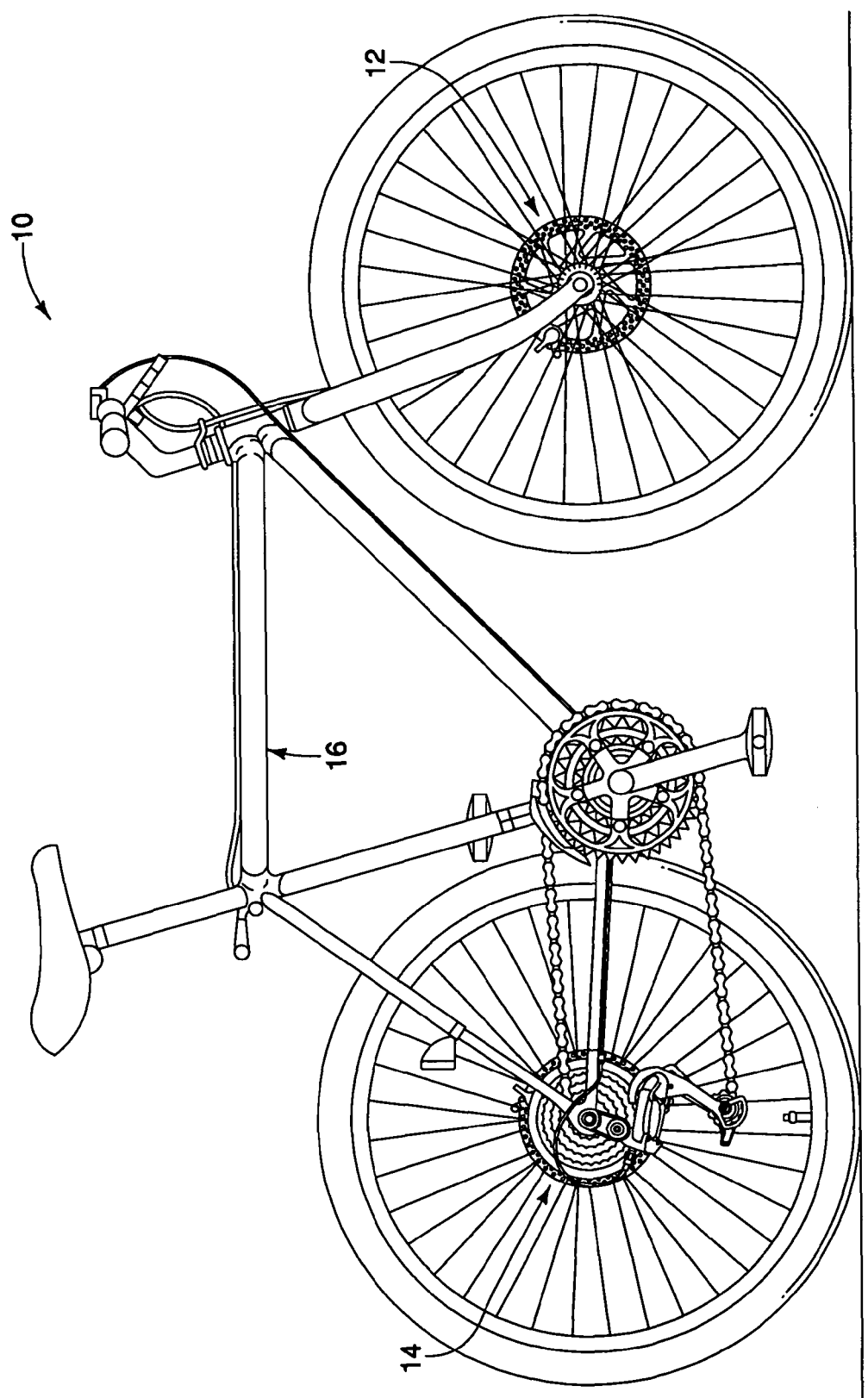
FIG. 1 is an overall right side elevational view of a bicycle provided with front and rear hubs having inner tubular structures in accordance with a first embodiment of the present invention.

Referring initially to FIG. 1, a bicycle 10 is illustrated that is equipped with a front hub 12 and a rear hub 14 in accordance with a first embodiment of the present invention. The bicycle hubs 12 and 14 are attached to a bicycle frame 16 in a conventional manner. Since the parts of the bicycle 10 are well known in the art, the parts of the bicycle 10 will not be discussed or illustrated in detail herein, except for the parts that relate to the present invention. In other words, only the parts related to the bicycle hubs 12 and 14 will be discussed and illustrated in detail herein. Moreover, various conventional bicycle parts such as brakes, additional sprockets, derailleurs, etc., which may or may not be illustrated herein, can be used in conjunction with the present invention.

As shown in FIGS. 2 and 3, the front hub 12 basically includes a hub axle 20, a hub body or shell 21, a pair of left and right bearings 22a and 22b and an inner tubular structure 23 for substantially preventing grease from flowing out from the bearings 22a and 22b toward the inner axial direction. The hub axle 20 is configured to be freely attachable to or detachable from the bicycle frame 16 in a conventional manner. The hub body 21 is coaxially disposed radially outwardly with respect to the hub axle 20. The left bearing 22a and the right bearing 22b are disposed between the hub axle 20 and the hub body 21 at axial end portions of hub body 21 as seen in FIG. 2. The hub body 21 is freely rotatable on the hub axle 20 in both rotational directions by the hub axle 20.

In the illustrated embodiment, the hub axle 20 of the front hub 12 is arranged as a quick release lever type hub axle. Thus, the hub axle 20 of the front hub 12 has a hollow axle body as shown that is configured to receive a quick hub rod (not shown) with an adjusting nut at one end and a cam lever at the other end. The hub axle 20 has a right handed male screw section 20a on the outer peripheral surface of the left end and a right handed male screw section 20b on the outer peripheral surface of the right end. The male screw section 20a is arranged to extend from a portion located slightly inside of the portion to which the left bearing 22a is mounted toward the outward axial direction. The male screw section 20b is arranged to extend from a portion located slightly inside of the portion to which the right bearing 22b is mounted toward the outward axial direction. The left and right bearings 22a and 22b are threadedly mounted to the hub body 21 by the screw sections 20a and 20b, respectively.

The hub body 21 of the front hub 12 has a generally tubular shape and is, for example, made of aluminum alloy. The hub body 21 includes a pair of hub flanges 30a and 30b on the outer peripheral surface for attaching spokes thereto in conventional manner. The hub body 21 further includes an internal bore with a pair of bearing mounting sections 21a and 21b at each axial end portion for receiving the left bearing 22a and the right bearing 22b, respectively, and a center tube section 21c.

The left bearing 22a basically includes a left outer ring or cup 31a, a left inner ring or cone 32a and a plurality of generally spherical rolling components 33a (only one left rolling component 33a is shown in FIG. 2). Similarly, the right bearing 22b basically includes a right outer ring 31b, a right inner ring 32b and a plurality of generally spherical rolling components 33b (only one right rolling component is shown in FIG. 2). As seen in FIG. 2, the left outer ring 31a of the left bearing 22a and the right outer ring 31b of the right bearing 22b are pressed into the bearing mounting sections 21a and 21b of the hub body 21, respectively, which are formed on the inner perimeter in the axial end portions of the hub body 21.

As best seen in FIG. 2, the left outer ring 31a includes a ball receiving surface (outer bearing surface) that faces in a generally axial outward direction towards the first or left axle end of the hub axle 20. The left inner ring 32a includes a ball pushing surface (inner bearing surface) that faces in a generally axial inward direction towards the second or right axle end of the hub axle 20. Likewise, the right outer ring 31b includes a ball receiving surface (outer bearing surface) that faces in a generally axial outward direction towards the second or right axle end of the hub axle 20. The right inner ring 32b includes a ball pushing surface (inner bearing surface) that faces in a generally axial inward direction towards the first or left axle end of the hub axle 20. Therefore, the left bearing 22a and the right bearing 22b are arranged as angular ball bearings, in which the load capacity relative to the thrust direction is greater. The first axial end of the left inner tube 34a is attached to an inner edge of the left outer ring 31a, while the first axial end of the right inner tube 34b is attached to an inner edge of the right outer ring 31b in the same manner as the left inner tube 34a is attached to the left outer ring 31a.

The left and right inner rings 32a and 32b have internal bores with female threads that are screwed into the screw sections 20a and 20b, which are formed on the outer peripheral surface of the hub axle 20. The axial positions of the left inner ring 32a and the right inner ring 32b are locked by a pair of lock nuts 35a and 35b that are installed in contact with the axial end surfaces of the left inner ring 32a and the right inner ring 32b, respectively. Therefore, the left inner ring 32a and the right inner ring 32b are not movable in the axial direction. The lock nuts 35a and 35b are configured to form part of the axle mounting structure for the front hub 12. The front hub 12 also includes various left and right sealing components 39a and 39b for sealing the end gaps between the hub body 21 and the left and right inner rings 32a and 32b. Thus, the sealing components 39a and 39b are disposed in the outer axial end portions of the left bearing 22a and the right bearing 22b, respectively.

Figure 4:
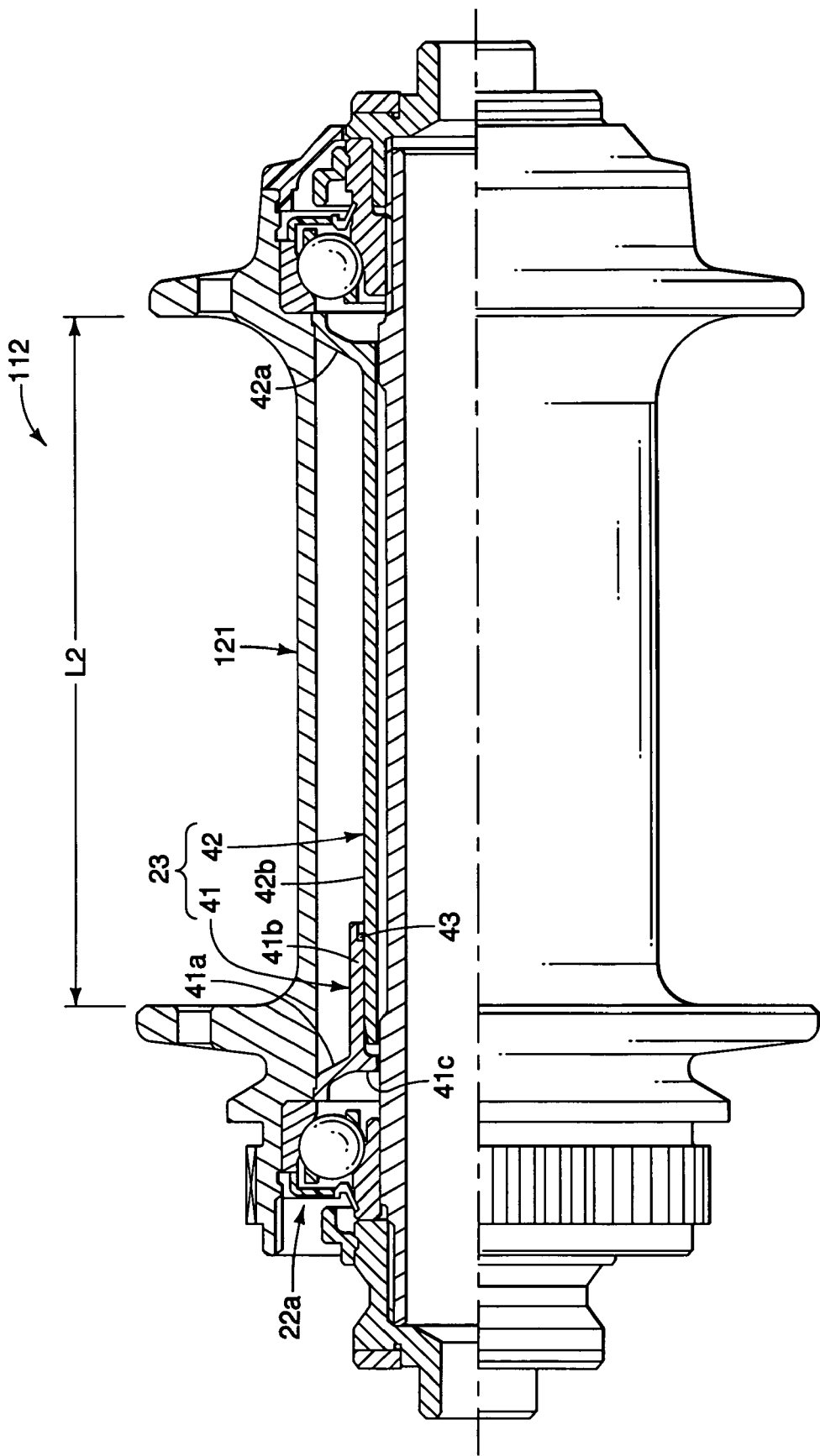
FIG. 4 is a partial cross sectional view of a modified hub provided with the inner tubular structure in accordance with the first embodiment of the present invention.

In the front hub 12 of this embodiment, the inner tubular structure 23 basically includes a first or left inner tube 41 (FIG. 5), a second or right inner tube 42 (FIG. 6), and a sealing element 43 (FIG. 3). The left and right inner tubes 41 and 42 are telescopically arranged so that they can be used with hubs having different axial lengths between the left and right bearings 22a and 22b. For example, FIG. 4 shows a front hub 112 that uses the same inner tubular structure 23 that is used in the hub 12 of FIG. 2. The front hub 112 is substantially identical to the front hub 12 of FIG. 2, except that a hub shell 121 is used that has a disc brake rotor mounting structure. Thus, unless otherwise specified below or shown in the drawings, the front hub 12 and the front hub 112 are substantially identical. As can be readily seen in FIGS. 2 and 4, the hub 12 of FIG. 2 has an axial length L1 between the hub flanges 30a and 30b that is larger than an axial length L2 between hub flanges 130a and 130b of the front hub 112.

In the illustrated embodiments, the right inner tube 42 is dimensioned to be inserted within the left inner tube 41 when the hub 12 is assembled. However, it will be apparent to those skilled in the art from this disclosure that the left and right inner tubes 41 and 42 can be dimensioned so that the left inner tube 41 is dimensioned to be inserted within the right inner tube 42 when the hub 12 is assembled. Also it will be apparent to those skilled in the art from this disclosure that the axial lengths of the left and right inner tubes 41 and 42 can be adjusted as needed and or desired so long as there is an overlap therebetween. Preferably, the inner tube having a smaller transverse width in a radial direction (e.g. the right inner tube 42 in the embodiment illustrated in FIG. 2) has a larger axial length than the axial length of the other inner tube having a larger transverse width in a radial direction (e.g. the left inner tube 41 in the embodiment illustrated in FIG. 2) because such an arrangement results in a total weight-saving for the entire structure of the inner tubular structure. Furthermore, it will be apparent to those skilled in the art from this disclosure that the left and right inner tubes 41 and 42 can be configured so that the sealing element 43 is retained on either of the left and right inner tubes 41 and 42.

Figure 5:
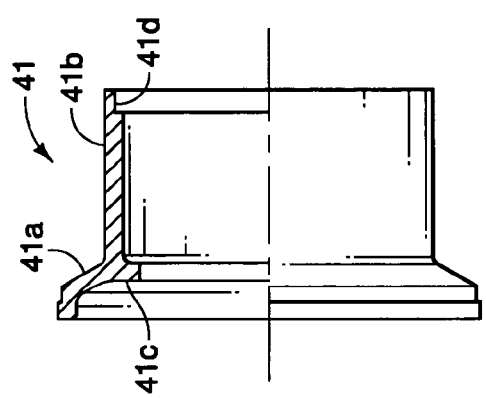
FIG. 5 is a partial cross sectional view of the first or left inner tube that is used in both the front and rear hubs in accordance with the first embodiment of the present invention.

As seen in FIG. 5, the left inner tube 41 is a one-piece, unitary member made from a suitable material such as a hard plastic resin or a metallic material. The left inner tube 41 is preferably press fitted within the left end of the center tube section 21c of the hub body 21 as seen in FIG. 2. When the left bearing 22a is mounted in the bearing mounting section 21a of the hub body 21, the left inner tube 41 is prevented from moving in towards the left end of the hub body 21. The left inner tube 41 basically has a fixed portion 41a, a free end portion 41b and an inner protrusion 41c.

The fixed portion 41a of the left inner tube 41 is preferably press fitted within the left end of the center tube section 21c of the hub body 21, while the free end portion 41b is held coaxially around the hub axle 20 with a predetermined radial gap. Thus, the left inner tube 41 is secured to the hub body 21 such that the free end portion 41b is held in a cantilever manner by the hub body 21. The inner protrusion 41c is configured and arranged to reduce an innermost transverse width or diameter of the left inner tube 41 so as to be dimensioned to be substantially equal to an innermost transverse width of the right inner tube 42. Preferably, the inner protrusion 41c is configured and arranged to form a small annular clearance or gap (approximately 0.4 mm) between the hub axle 20 and the inner protrusion 41c. Thus, the grease contained inside the left bearing 22a is less likely to leak toward the inner axial direction of the hub axle 20.

Preferably, the free end portion 41b of the left inner tube 41 is provided with an annular recess or groove 41d that is formed on the internal surface of the free end portion 41b of the left inner tube 41. The annular groove 41d is dimension to frictionally retain the sealing element 43 therein. In this preferred embodiment, the sealing element 43 is an O-ring that is made of a resilient elastomeric material.

Figure 6:
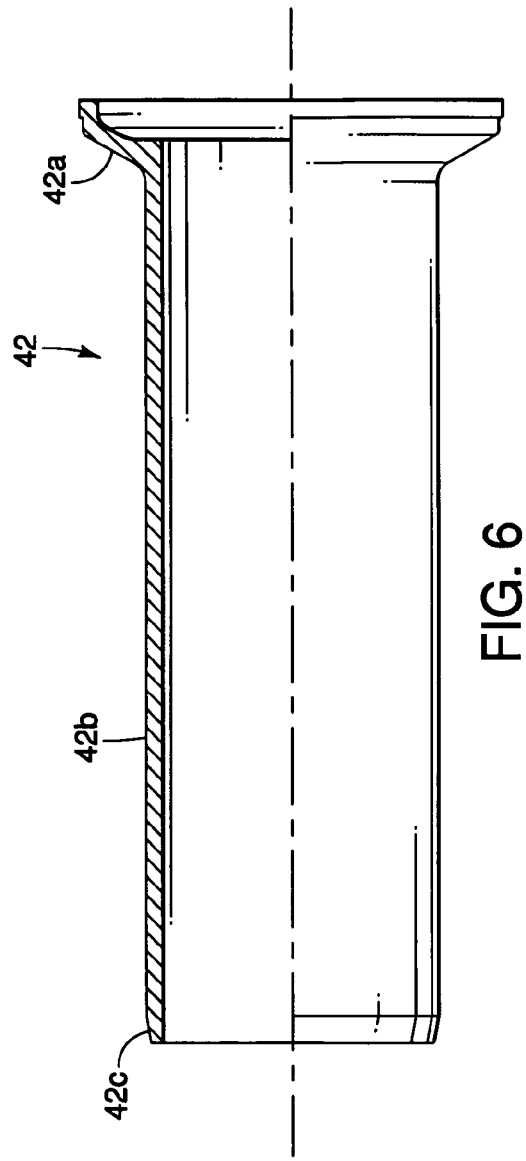
FIG. 6 is a partial cross sectional view of the second or right inner tube that is used in both the front and rear hubs in accordance with the first embodiment of the present invention.

As seen in FIG. 6, the right inner tube 42 is a one-piece, unitary member made from a suitable material such as a hard plastic resin or a metallic material. Preferably, the left and right inner tubes 41 and 42 are formed of the same material. The right inner tube 42 is preferably press fitted within the right end of the center tube section 21c of the hub body 21. When the right bearing 22b is mounted in the bearing mounting section 21b of the hub body 21, the right inner tube 42 is prevented from moving in towards the right end of the hub body 21. The right inner tube 42 basically has a fixed portion 42a and a free end portion 42b with its externally facing surface including a tapered (conical) section 42c. The tapered section 42c is located at its free axial edge such that the tapered section 42c decreases in diameter as the externally facing surface approaches the free edge of the free end portion 42b of the right inner tube 42. In other words, the externally facing surface of the free end portion 42b is preferably arranged such that the outer diameter of the free end portion 42b of the right inner tube 42 gradually becomes smaller towards the free edge of the free end portion 42b of the right inner tube 42 in a tapered manner. This tapered section 42c provides for easy insertion of the right inner tube 42 into the free end portion 41b of the left inner tube 41 as seen in FIG. 3.

The fixed portion 42a of the right inner tube 42 is preferably press fitted within the left end of the center tube section 21c of the hub body 21, while the free end portion 42b is held coaxially around the hub axle 20 with a predetermined radial gap. Thus, the right inner tube 42 is secured to the hub body 21 such that the free end portion 42b is held in a cantilever manner by the hub body 21. The free end portion 42b has a uniform internal surface configured and arranged with an innermost transverse width or diameter that is dimensioned to be substantially equal to the innermost transverse width of the inner protrusion 41c of the left inner tube 41. Preferably, the internal surface of the free end portion 42b is configured and arranged to form a small annular clearance or gap (approximately 0.4 mm) between the hub axle 20 and the internal surface of the free end portion 42b. Thus, the grease contained inside the right bearing 22b is less likely to leak toward the inner axial direction of the hub axle 20. Preferably, the innermost transverse width or diameter of the internal surface of the free end portion 42b is substantially equal to the innermost transverse width of the fixed portion 42a where the free end portion 42b meets with the fixed portion 42a.

Accordingly with the inner tubular structure 23 of the present invention, when the front wheel rotates in the direction of travel, if the left and right inner tubes 41 and 42 were not provided, then the grease tends to leak out from the bearings 22a and 22b. However, by installing the left and right inner tubes 41 and 42, as seen in FIG. 2, the clearance between the hub axle 20 and the hub body 21 is narrowed. Consequently, the grease is less likely to leak in the inner axial direction of the hub axle 20 and more likely to be retained within the bearings 22a and 22b. In addition, because there is the clearance (approximately 0.4 mm) between the left and right inner tubes 41 and 42 and the hub axle 20, the deterioration of rotational performance of the left and right bearings 22a and 22b can be prevented.

Second Embodiment

Referring now to FIGS. 7-10, a modified front hub 12' with a modified inner tubular structure 23' for substantially preventing grease from flowing out from the bearings 22a and 22b toward the inner axial direction is illustrated in accordance with a second embodiment. Basically, the modified front hub 12' is identical to the front hub 12, except for the modified inner tubular structure 23'. Thus, the identical parts of the front hubs 12 and 12' will be given the same reference numerals.

In this embodiment, the inner tubular structure 23' basically includes a first or left inner tube 41' (FIG. 9), a second or right inner tube 42' (FIG. 10), and a sealing element 43' (FIG. 8). The left and right inner tubes 41' and 42' are telescopically arranged so that they can be used with hubs having different axial lengths between the left and right bearings 22a and 22b. For example, the inner tubular structure 23' can be used in the front hub 112 of FIG. 4.

Figure 9:
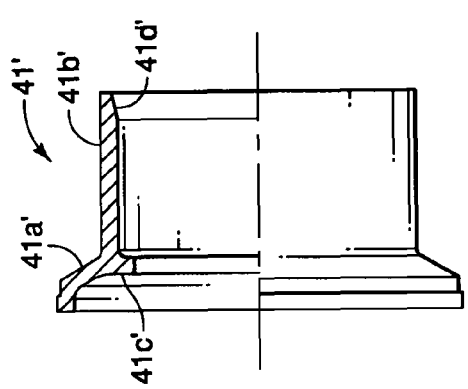
FIG. 9 is a partial cross sectional view of the rear hub provided with the inner tubular structure in accordance with the second embodiment of the present invention.

As seen in FIG. 9, the left inner tube 41' is a one-piece, unitary member made from a suitable material such as a hard plastic resin or a metallic material. When the left bearing 22a is mounted in the bearing mounting section 21a of the hub body 21, the left inner tube 41' is prevented from moving in towards the left end of the hub body 21. The left inner tube 41' basically has a fixed portion 41a', a free end portion 41b' and an inner protrusion 41c'.

The fixed portion 41a' of the left inner tube 41' is preferably press fitted within the left end of the center tube section 21c' of the hub body 21, while the free end portion 41b' is held coaxially around the hub axle 20 with a predetermined radial gap. Thus, the left inner tube 41' is secured to the hub body 21 such that the free end portion 41b' is held in a cantilever manner by the hub body 21. The inner protrusion 41c' is configured and arranged to reduce an innermost transverse width or diameter of the left inner tube 41' so as to be dimensioned to be substantially equal to an innermost transverse width of the right inner tube 42'. Preferably, the inner protrusion 41c' is configured and arranged to form a small annular clearance or gap (approximately 0.4 mm) between the hub axle 20 and the inner protrusion 41c'.

Preferably, the free end portion 41b' of the left inner tube 41' includes a tapered (conical) section 41d' on its internally facing surface. The tapered section 41d' is located at its free axial edge such that the tapered section 41d' increases in diameter as the internally facing surface approaches the free edge of the free end portion 41b' of the left inner tube 41'. In other words, the internally facing surface of the free end portion 41b' is preferably arranged such that the inner diameter of the free end portion 41b' of the left inner tube 41' gradually becomes larger towards the free edge of the free end portion 41b' of the left inner tube 41' in a tapered manner. This tapered section 41d' provides for easy insertion of the left inner tube 41' onto the right inner tube 42' as seen in FIG. 8.

Figure 10:
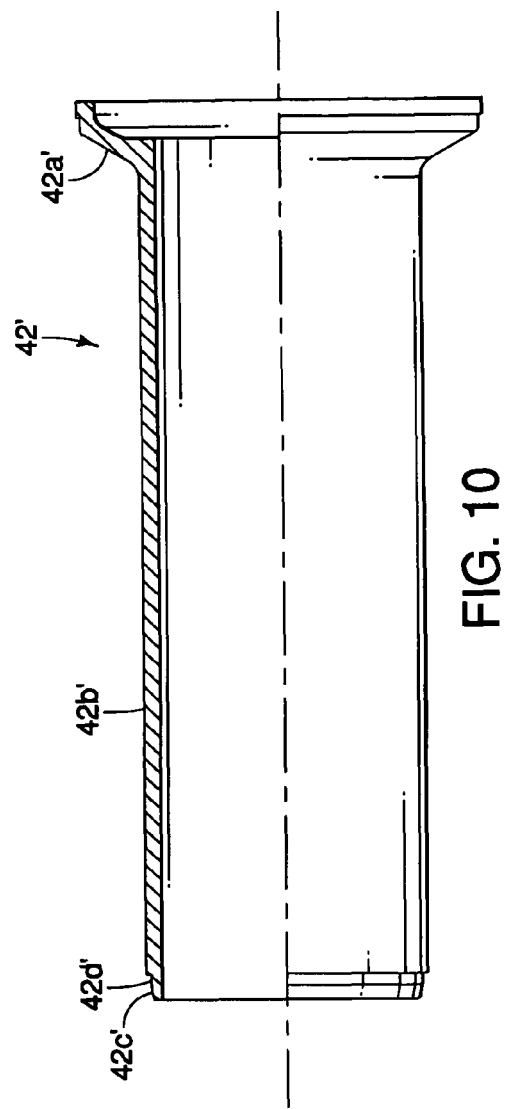
FIG. 10 is a partial cross sectional view of the first or left inner tube that is used in both the front and rear hubs in accordance with the second embodiment of the present invention.

As seen in FIG. 10, the right inner tube 42' is a one-piece, unitary member made from a suitable material such as a hard plastic resin or a metallic material. When the right bearing 22b is mounted in the bearing mounting section 21b of the hub body 21, the right inner tube 42' is prevented from moving in towards the right end of the hub body 21. The right inner tube 42' basically has a fixed portion 42a' and a free end portion 42b' with its externally facing surface including a tapered (conical) section 42c' and an annular recess or groove 42d'. The tapered section 42c' is located at its free axial edge such that the tapered section 42c' decreases in diameter as the externally facing surface approaches the free edge of the free end portion 42b' of the right inner tube 42'. In other words, the externally facing surface of the free end portion 42b' is preferably arranged such that the outer diameter of the free end portion 42b' of the right inner tube 42' gradually becomes smaller towards the free edge of the free end portion 42b' of the right inner tube 42 in a tapered manner. This tapered section 42c' provides for easy insertion of the right inner tube 42' onto the free end portion 41b' of the left inner tube 41' as seen in FIG. 8.

The annular recess or groove 42d' that is formed on the externally facing surface of the free end portion 42b' of the right inner tube 42' is dimension to frictionally retain the sealing element 43' therein. In this preferred embodiment, the sealing element 43' is an O-ring that is made of a resilient elastomeric material.

The fixed portion 42a' of the right inner tube 42' is preferably press fitted within the left end of the center tube section 21c of the hub body 21, while the free end portion 42b' is held coaxially around the hub axle 20 with a predetermined radial gap. Thus, the right inner tube 42' is secured to the hub body 21 such that the free end portion 42b' is held in a cantilever manner by the hub body 21. The free end portion 42b' has a uniform internal surface configured and arranged with an innermost transverse width or diameter that is dimensioned to be substantially equal to the innermost transverse width of the inner protrusion 41c' of the left inner tube 41'. Preferably, the internal surface of the free end portion 42b' is configured and arranged to form a small annular clearance or gap (approximately 0.4 mm) between the hub axle 20 and the internal surface of the free end portion 42b'. Thus, the grease contained inside the right bearing 22b is less likely to leak toward the inner axial direction of the hub axle 20. Preferably, the innermost transverse width or diameter of the internal surface of the free end portion 42b' is substantially equal to the innermost transverse width of the fixed portion 42a' where the free end portion 42b' meets with the fixed portion 42a'.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub comprising:
   a hub axle having a first axle end and a second axle end;
   a hub body having a first body end with a first spoke attachment structure and a second body end with a second spoke attachment structure, with the hub body being coaxially disposed about the hub axle and rotatable with respect to the hub axle;
   a first bearing disposed between the first body end of the hub body and the first end of the hub axle; and
   a second bearing disposed between the second body end of the hub body and the second axle end of the hub axle; and
   an inner tubular structure including a first inner tube and a second inner tube, the first inner tube having a first fixed portion fixedly secured relative to the first body end adjacent to the first bearing and a first free end portion, the second inner tube having a second fixed portion fixedly secured relative to the second body end adjacent to the second bearing and a second free end portion, and the first and second free end portions being telescopically arranged,
   the inner tubular structure further including a sealing element operatively disposed between the first and second free end portions of the first and second inner tubes, one of the first and second inner tubes having an annular recess with the sealing element disposed within the recess.

2. The bicycle hub as recited in claim 1, wherein
   the sealing element is mounted to one of the first and second inner tubes that has a larger transverse width in a radial direction.

3. The bicycle hub as recited in claim 1, wherein
   the sealing element is mounted to one of the first and second inner tubes that has a smaller transverse width in a radial direction.

4. The bicycle hub as recited in claim 1, wherein
   one of the first and second free end portions of the first and second inner tubes includes a tapered surface to provided easy insertion.

5. The bicycle hub as recited in claim 4, wherein
   the tapered surface is formed as an internal surface of the one of the first and second free end portions of the first and second inner tubes.

6. The bicycle hub as recited in claim 4, wherein
   the tapered surface is formed as an external surface of the one of the first and second free end portions of the first and second inner tubes.

7. The bicycle hub as recited in claim 1, wherein
   the first and second inner tubes are each formed as a rigid one-piece, unitary member.

8. The bicycle hub as recited in claim 1, wherein
   the first and second inner tubes are secured directly to the first and second body ends, respectively.

9. The bicycle hub as recited in claim 1, wherein
   the hub body is supported by the first and second bearings to rotate freely in both rotational directions on the hub axle.

10. A bicycle hub comprising:
    a hub axle having a first axle end and a second axle end;
    a hub body having a first body end with a first spoke attachment structure and a second body end with a second spoke attachment structure, with the hub body being coaxially disposed about the hub axle and rotatable with respect to the hub axle;
    a first bearing disposed between the first body end of the hub body and the first end of the hub axle; and
    a second bearing disposed between the second body end of the hub body and the second axle end of the hub axle; and
    an inner tubular structure including a first inner tube and a second inner tube, the first inner tube having a first fixed portion fixedly secured relative to the first body end adjacent to the first bearing and a first free end portion, the second inner tube having a second fixed portion fixedly secured relative to the second body end adjacent to the second bearing and a second free end portion, and the first and second free end portions being telescopically arranged,
    the first free end portion of the first inner tube having a larger transverse width in a radial direction than the second free end portion of the second inner tube, and the first fixed portion of the first inner tube having an inner protrusion with an innermost transverse width that is dimensioned to be substantially equal to an innermost transverse width of the second fixed portion of the second inner tube.

11. The bicycle hub as recited in claim 10, wherein
    one of the first and second free end portions of the first and second inner tubes includes a tapered surface to provided easy insertion.

12. The bicycle hub as recited in claim 11, wherein
    the tapered surface is formed as an internal surface of the one of the first and second free end portions of the first and second inner tubes.

13. The bicycle hub as recited in claim 11, wherein
    the tapered surface is formed as an external surface of the one of the first and second free end portions of the first and second inner tubes.

14. The bicycle hub as recited in claim 13, wherein
    the sealing element is mounted to the first inner tube.

15. The bicycle hub as recited in claim 13, wherein
    the sealing element is mounted to the second inner tube.

16. The bicycle hub as recited in claim 13, wherein
    one of the first and second inner tubes has an annular recess with the sealing element disposed within the recess.

17. The bicycle hub as recited in claim 10, wherein
    the inner tubular structure further includes a sealing element operatively disposed between the first and second free end portions of the first and second inner tubes.

* * * * *